United States Patent [19]

Shirk

[11] Patent Number: 5,968,376
[45] Date of Patent: Oct. 19, 1999

[54] METHOD FOR INFRARED INSPECTION OF RESISTENCE WELDS DURING ASSEMBLING OF AN INFLATOR

[75] Inventor: Bryan W. Shirk, Mesa, Ariz.

[73] Assignee: TRW Inc., Lyndhurst, Ohio

[21] Appl. No.: 09/136,532

[22] Filed: Aug. 19, 1998

[51] Int. Cl.⁶ .................................................. B23K 11/25
[52] U.S. Cl. ...................................... 219/109; 219/117.1
[58] Field of Search .................................... 219/91.2, 109, 219/110, 117.1

[56] References Cited

U.S. PATENT DOCUMENTS

| 2,263,740 | 11/1941 | Sample | 219/117.1 |
|---|---|---|---|
| 4,168,430 | 9/1979 | Denis et al. | 219/110 X |
| 4,214,164 | 7/1980 | Traub et al. . | |
| 4,365,307 | 12/1982 | Tatsuwaki et al. . | |
| 4,481,418 | 11/1984 | Vanzetti et al. . | |
| 4,532,404 | 7/1985 | Boillot et al. . | |
| 4,620,799 | 11/1986 | Palazzetti et al. . | |
| 4,663,513 | 5/1987 | Webber . | |
| 4,696,101 | 9/1987 | Vanzetti et al. . | |
| 4,782,230 | 11/1988 | Heinzel | 250/338.1 |
| 4,806,723 | 2/1989 | Beynon et al. | 219/109 |
| 4,854,724 | 8/1989 | Adams et al. . | |
| 5,283,416 | 2/1994 | Shirk . | |
| 5,360,960 | 11/1994 | Shirk . | |
| 5,651,903 | 7/1997 | Shirk . | |
| 5,787,563 | 8/1998 | Jenkins et al. | 219/91.2 X |

FOREIGN PATENT DOCUMENTS

| 58-41686 | 3/1983 | Japan . |
|---|---|---|
| 3-20965 | 1/1991 | Japan . |
| 5-115979 | 5/1993 | Japan . |
| 7-63694 | 3/1995 | Japan . |
| 7-185832 | 7/1995 | Japan . |

OTHER PUBLICATIONS

Copending U.S. Patent Application Serial No. 08/921,723, filed Aug. 29, 1997, entitled "Method of Assembling an Igniter."

Primary Examiner—Gregory Mills
Attorney, Agent, or Firm—Tarolli, Sundheim, Covell, Tummino & Szabo

[57] ABSTRACT

The invention is a method of forming and evaluating a weld (52). In an initial step, first and second welding electrodes (56, 60) are placed against corresponding first and second contact surface areas (57, 61) on a pair of adjoining metal parts (44, 40). A welding level of electric current is directed between the electrodes (56, 60) to form an electrical resistance weld (52) between the metal parts (44, 40). The first electrode (56) is then removed from the first contact surface area (57). A subsequent step includes sensing surface temperatures at the first contact surface area (57) by sensing infrared radiation emitted from the first contact surface area (57) under the influence of heat previously generated resistively by the welding level of electric current. The resistance weld (52) is evaluated by comparing the sensed surface temperatures with specified surface temperatures corresponding to specified weld conditions.

5 Claims, 3 Drawing Sheets

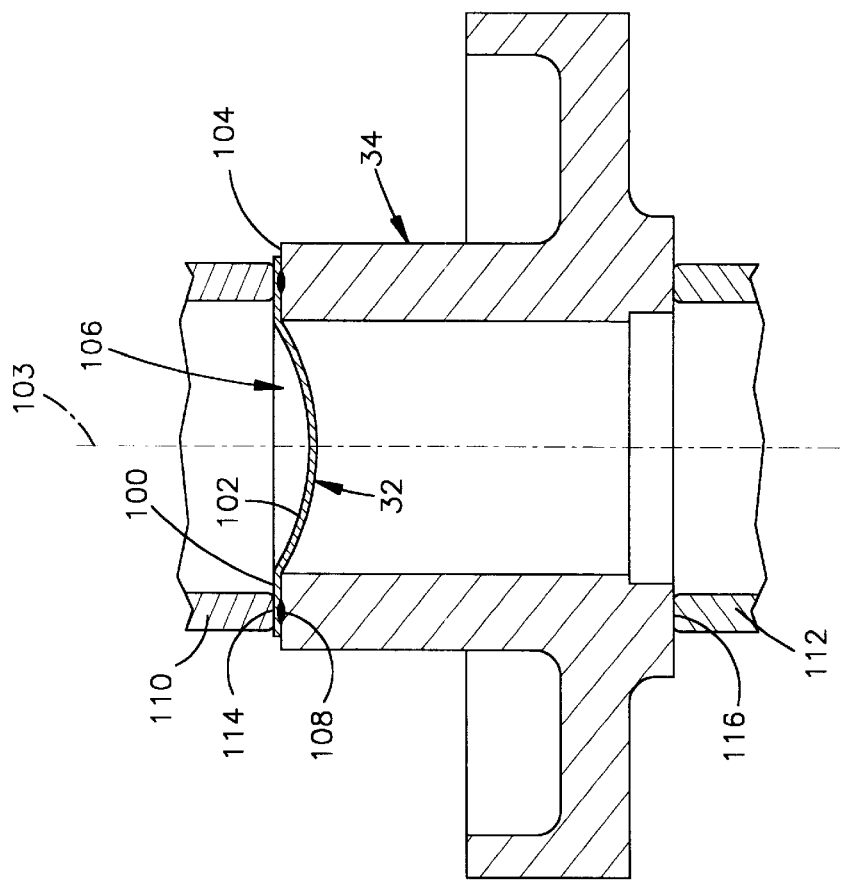
Fig.7
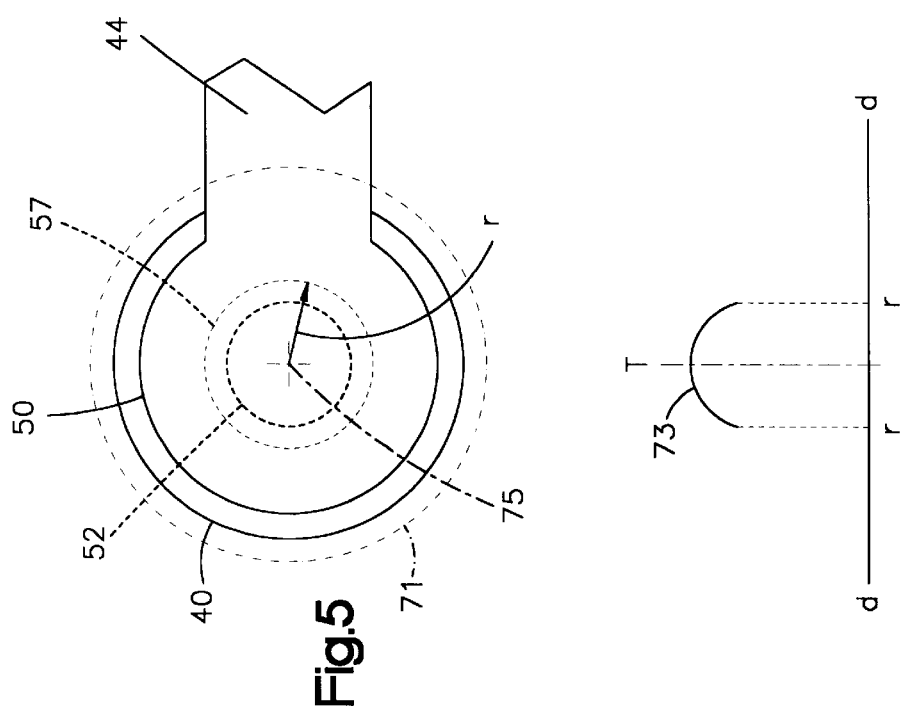
Fig.5
Fig.6

METHOD FOR INFRARED INSPECTION OF RESISTENCE WELDS DURING ASSEMBLING OF AN INFLATOR

FIELD OF THE INVENTION

The present invention relates to an inflator for inflating a vehicle occupant protection device, such as an air bag, and particularly relates to a method of assembling the inflator by the use of electrical resistance welds.

BACKGROUND OF THE INVENTION

An inflator for an inflatable vehicle occupant protection device, such as an air bag, may include a container storing pressurized inflation fluid. The container has an outlet opening which is closed by a rupturable closure wall.

In addition to the inflation fluid, the container may store ignitable material for heating the inflation fluid. Such an inflator has an igniter containing a small charge of pyrotechnic material. A bridgewire in the igniter extends between a pair of electrodes in a heat transferring relationship with the pyrotechnic material. When the air bag is to be inflated, an actuating level of electric current is directed between the electrodes through the bridgewire. This causes the bridgewire to become resistively heated sufficiently to ignite the pyrotechnic material. The pyrotechnic material then produces combustion products which, in turn, ignite the ignitable material stored in the container.

The fluid pressure inside the container is increased by the heat generated upon combustion of the ignitable material. When the increasing fluid pressure reaches a predetermined elevated level, it ruptures the closure wall. The inflation fluid then flows from the container through the outlet opening and into the air bag more quickly than if it had not been heated and further pressurized.

Welds are used to connect the bridgewire electrically between the electrodes in the igniter, and also to fix and seal the closure wall across the outlet opening. Accordingly, it may be desirable to examine and evaluate the bridgewire welds to ensure that ignition of the ignitable material will be achieved reliably. Likewise, it may be desirable to examine and evaluate the closure wall welds to ensure that the appropriate elevated fluid pressure levels can be attained prior to rupturing of the closure wall.

SUMMARY OF THE INVENTION

The present invention is a method of forming and evaluating a weld. In an initial step, first and second welding electrodes are placed against corresponding first and second contact surface areas on a pair of adjoining metal parts. A welding level of electric current is directed between the electrodes to form an electrical resistance weld between the metal parts. The first electrode is then removed from the first contact surface area. A subsequent step comprises sensing surface temperatures at the first contact surface area by sensing infrared radiation emitted from the first contact surface area under the influence of heat previously generated resistively by the welding level of electric current. The resistance weld is evaluated by comparing the sensed surface temperatures with specified surface temperatures corresponding to specified weld conditions.

BRIEF DESCRIPTION OF THE DRAWINGS

Further features of the present invention will become apparent to those skilled in the art to which the present invention relates from reading the following description with reference to the accompanying drawings, in which:

FIG. 5 is a view taken on line 5—5 of FIG. 4;

FIG. 6 is a graph showing a temperature gradient specified in accordance with the present invention;

FIG. 7 is an enlarged partial view showing a welding apparatus used to join other parts of the inflator of FIG. 1 in accordance with the present invention;

DESCRIPTION OF THE INVENTION

Figure 1:
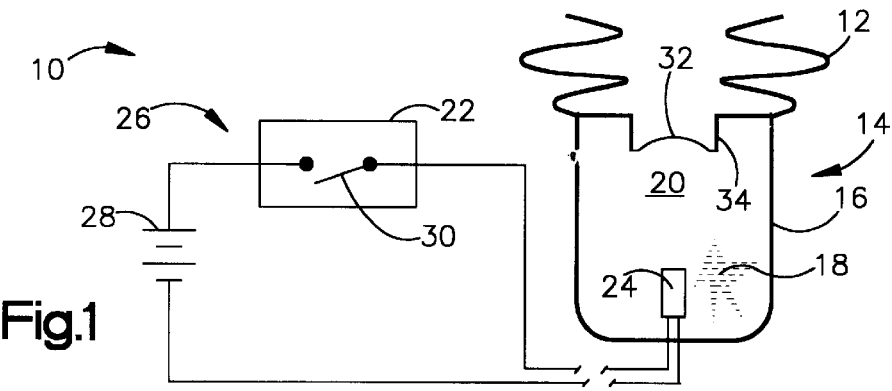
FIG. 1 is a schematic view of a vehicle occupant protection apparatus including an inflator assembled in accordance with the present invention.

A vehicle occupant protection apparatus 10 is shown schematically in FIG. 1. The apparatus 10 includes a particular type of inflatable vehicle occupant protection device 12 which is commonly referred to as an air bag. Other inflatable vehicle occupant protection devices that can be used with the apparatus 10 include, for example, inflatable seat belts, inflatable knee bolsters, inflatable head liners or side curtains, and knee bolsters operated by inflatable air bags. The apparatus 10 further includes an inflator 14 for inflating the air bag 12. When the air bag 12 is inflated, it extends into a vehicle occupant compartment (not shown) to help restrain a vehicle occupant from moving under the influence of vehicle crash forces.

The inflator 14 comprises a container 16 which stores pressurized inflation fluid for inflating the air bag 12. The container 16 also stores ignitable material for heating the inflation fluid. Specifically, the container 16 stores a pressurized, combustible mixture of gases 18 in a storage chamber 20. The combustible mixture of gases 18 includes a primary gas and fuel gas. The primary gas comprises the majority of the inflation fluid that inflates the air bag 12. The fuel gas, when ignited, heats the primary gas.

The combustible mixture of gases 18 may have any suitable composition known in the art, but preferably has a composition in accordance with the invention set forth in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc. The storage pressure in the chamber 20 may vary, but is preferably within the range of approximately 1,500 psig to approximately 5,000 psig, and is most preferably approximately 2,500 psig.

The apparatus 10 further includes a crash sensor 22 and an electrically actuatable igniter 24. As shown schematically in FIG. 1, the crash sensor 22 and the igniter 24 are included in an electrical circuit 26 with a power source 28. The power source 28 is preferably the vehicle battery and/or a capacitor. The crash sensor 22 includes a normally open switch 30. As known in the art, the crash sensor 22 monitors vehicle conditions to sense a vehicle condition indicating the occurrence of a crash. The crash-indicating condition may comprise, for example, sudden vehicle deceleration that is caused by a crash. If the crash-indicating condition is at or above a predetermined threshold level, it indicates the occurrence of a crash having at least a predetermined threshold level of severity. The threshold level of crash severity is a level at which inflation of the air bag 12 is desired to help protect an occupant of the vehicle. The switch 30 then closes and an actuating level of electric current is directed through the igniter 24 to actuate the igniter 24.

When the igniter 24 is actuated, it ignites the fuel gas in the mixture of gases 18. As the fuel gas burns, the pressure in the storage chamber 20 rises due to warming of the gases by the heat of combustion created by burning of the fuel gas. A burst disk 32 at an end wall 34 of the container 16 bursts open when the increasing pressure in the storage chamber 20 reaches a predetermined elevated level. The warm inflation gas then flows outward from the storage chamber 20 and into the air bag 12 to inflate the air bag 12.

Figure 2:
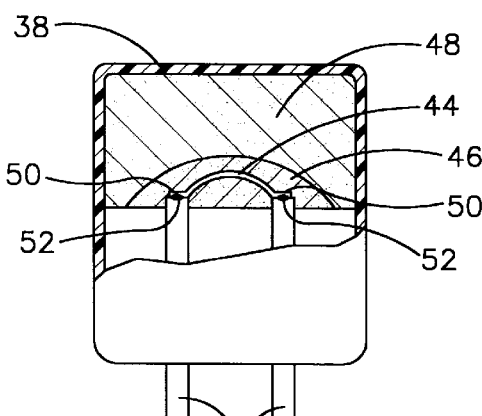
FIG. 2 is an enlarged sectional view of an igniter included in the inflator of FIG. 1.

As shown in greater detail in FIG. 2, the igniter 24 is a generally cylindrical part with a plastic casing 38 and a pair of axially projecting electrode pins 40. An ohmic (resistive) heating element in the form of a bridgewire 44 is connected between the electrode pins 40 within the casing 38. The bridgewire 44 and the electrode pins 40 may be formed of any suitable metal materials known in the art.

A small charge of pyrotechnic material in the form of an ignition droplet 46 adjoins the bridgewire 44. A main pyrotechnic charge 48 adjoins the ignition droplet 46. The pyrotechnic materials of which the ignition droplet 46 and the main pyrotechnic charge 48 are formed, including any non-pyrotechnic binders or other ingredients, may have any suitable compositions known in the art.

When the switch 30 closes, as described above with reference to FIG. 1, the actuating level of electric current is directed through the igniter 24 between the electrode pins 40. As the actuating level of electric current is conducted through the bridgewire 44, the bridgewire 44 resistively generates heat which is transferred directly to the ignition droplet 46. The ignition droplet 46 is then ignited and produces combustion products that ignite the main pyrotechnic charge 48. The main pyrotechnic charge 48 produces additional combustion products that rupture the casing 38 and disperse into the combustible mixture of gases 18 (FIG. 1) to ignite the fuel gas.

Figure 3:
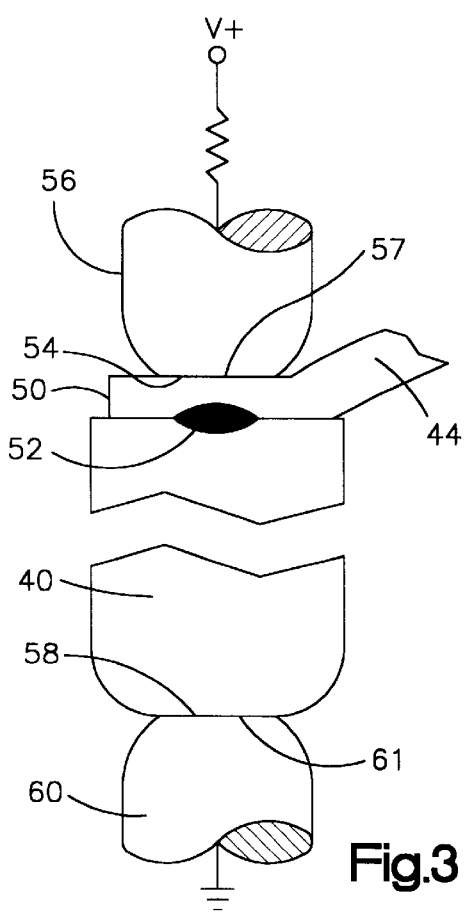
FIG. 3 is an enlarged partial view showing a welding apparatus used to join parts of the igniter of FIG. 2 in accordance with the present invention.

Opposite end portions 50 of the bridgewire 44 are joined to the electrode pins 40 by a pair of electrical resistance spot welds 52. Each spot weld 52 is formed in the manner shown by way of example in FIG. 3. The tip 54 of a first welding electrode 56 is placed against the end portion 50 of the bridgewire. The tip 54 then overlies a first contact surface area 57 on the end portion 50 of the bridgewire 44. The tip 58 of a second welding electrode 60 is similarly placed over a second contact surface area 61 on the electrode pin 40. Clamping pressure is applied by the welding electrodes 56 and 60, and a welding level of electric current is directed between the welding electrodes 56 and 60. The spot weld 52 is then formed under the influence of the clamping pressure and the heat generated resistively by the passage of the welding current through the electrode pin 40 and the end portion 50 of the bridgewire 44.

Figure 4:
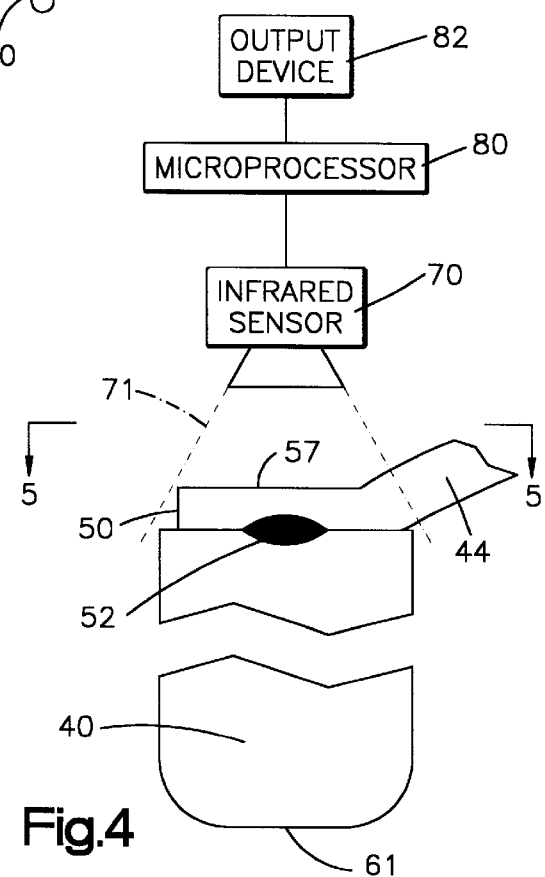
FIG. 4 is a view which is similar to FIG. 3, and which further shows an infrared sensing system used in accordance with the present invention.

Next, the welding electrodes 56 and 60 are removed from the contact surface areas 57 and 61. As shown in FIG. 4, an infrared sensor 70 is then used to sense infrared radiation emitted from the first contact surface area 57 under the influence of heat previously generated resistively by the welding level of electric current. The sensor 70 preferably is an infrared image scanning device. Such a device senses infrared radiation throughout a scanned field. The output of the sensor 70 indicates the distribution and level of infrared radiation, and hence the distribution and level of surface temperatures, throughout the scanned field. Further in accordance with the present invention, the sensor 70 scans a field 71 which is large enough to encompass fully the first contact surface area 57 on the end portion 50 of the bridgewire 44, as best shown in FIG. 5. The scanned field 71 thus overlies fully the entire spot weld 52.

The bonding strength and electrical conductivity of the weld 52 are determined by conditions including the size and continuity of the weld 52. Such conditions of the weld 52 can be indicated by the surface temperatures of the bridgewire 44 at the first contact surface area 57. For example, a relatively low temperature at a location within the first contact surface area 57 could indicate the presence of an underlying void in the weld 52.

In accordance with a particular feature of the present invention, the weld 52 is specified to have a size and continuity that will cause the first contact surface area 57 to have a specified surface temperature gradient like the gradient 73 shown by way of example in FIG. 6. The vertical axis of FIG. 6 indicates temperature T at the first contact surface area 57. The horizontal axis of FIG. 6 indicates distance d measured radially outward from the center 75 (FIG. 5) of the first contact surface area 57. When the weld 52 meets its specifications, the weld 52 (FIG. 5) and the first contact surface area 57 are substantially circular and concentric. The specified surface temperature gradient 73 of FIG. 6 extends diametrically across the first contact surface area 57, and declines continuously outward along the radius r of the first contact surface area 57. Moreover, the specified surface temperature gradient 73 is uniform circumferentially around the first contact surface area 57.

A microprocessor 80 (FIG. 4) interprets and responds to the output of the sensor 70 by directing an output device 82 to produce one or more representations of the surface temperatures indicated by the infrared radiation sensed by the sensor 70. Such representations may have any suitable format known in the art such as, for example, thermal images on the screen of a cathode ray tube. The output device 82, as well as the microprocessor 80, may thus comprise any suitable apparatus known in the art. The temperatures at the first contact surface area 57 are then compared with the specified surface temperature gradient 73 of FIG. 6. The result of this comparison indicates whether or not the weld 52 meets the specified conditions of size and continuity. The weld 52 can then be accepted or rejected accordingly.

The present invention is further applicable to the burst disk 32 at the end wall 34 of the container 14 (FIG. 1). As shown in FIG. 7, the burst disk 32 has a flat, annular rim portion 100 and a dome-shaped central portion 102 centered on an axis 103. The end wall 34 of the container 14 has an annular edge surface 104 defining a circular outlet opening 106 through which the warm inflation gas flows outward from the storage chamber 20 upon rupturing of the burst disk 32, as described above with reference to FIG. 1. The rim 100 of the burst disk 32 overlies the edge surface 104 of the end wall 34. An electrical resistance weld 108 extends circumferentially around the juncture of the rim 100 and the edge surface 104 to fix and seal the burst disk 32 to the end wall 34 at that location.

Figure 8:
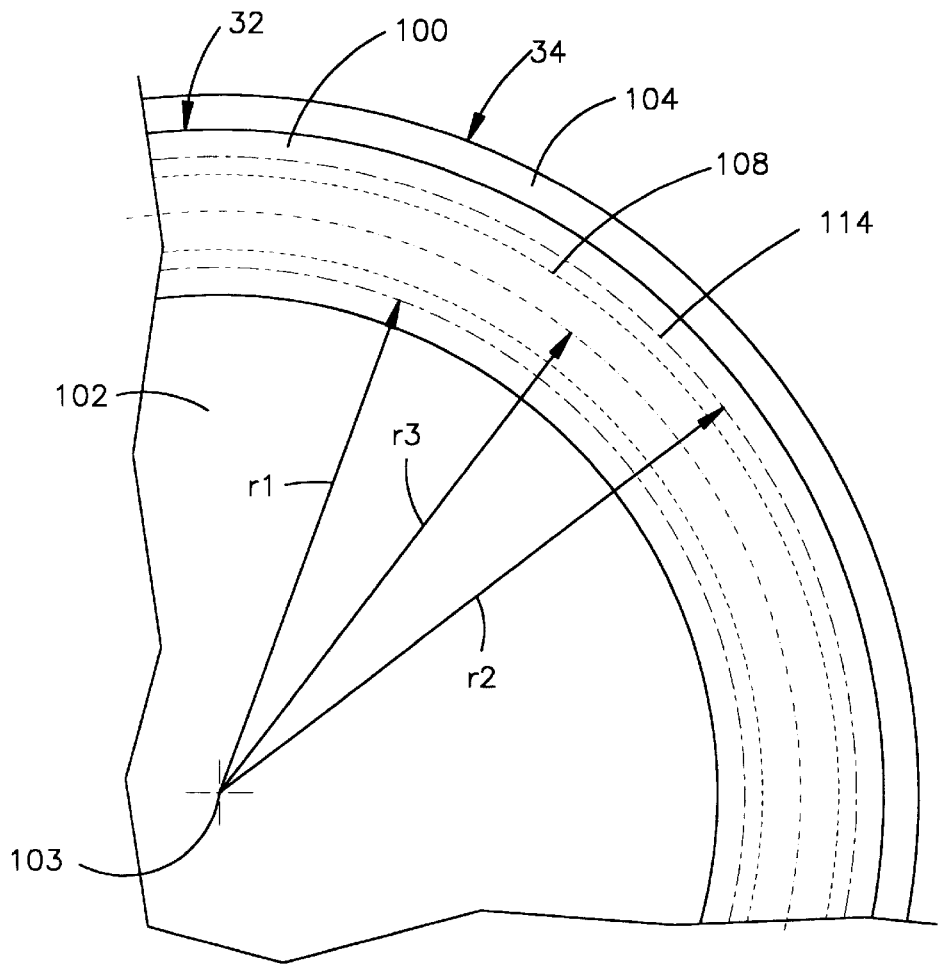
FIG. 8 is a partial view of parts shown in FIG. 7.

The weld 108 is formed by the pressure and heat generated resistively upon engagement of a pair of annular welding electrodes 110 and 112 with a corresponding pair of contact surface areas 114 and 116 on the burst disk 32 and the end wall 34, respectively. The weld 108 and the contact surface area 114 on the burst disk 32 have annular shapes and are substantially concentric with the burst disk 32. This is shown partially in FIG. 8. The contact surface area 114 thus has inner and outer radii r1 and r2 measured from the axis 103.

Figure 9:
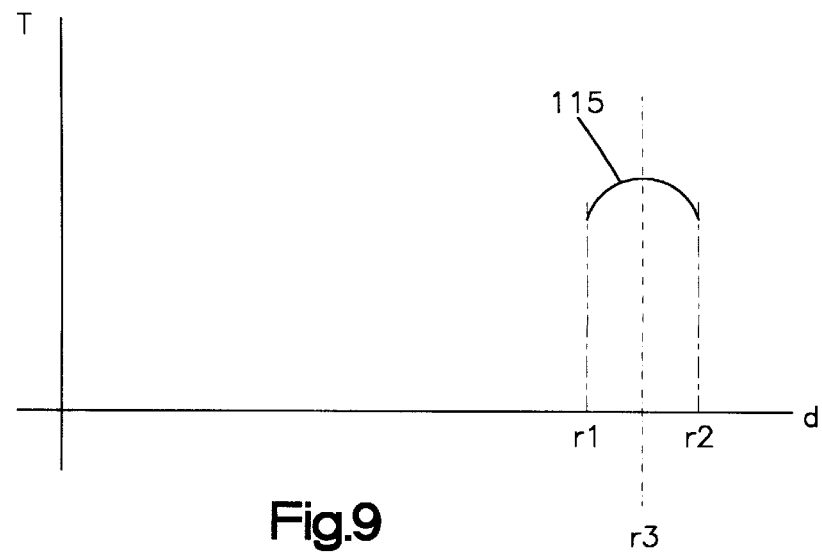
FIG. 9 is a graph showing another temperature gradient specified in accordance with the present invention.

A specified gradient 115 of surface temperatures for the contact surface area 114 is shown in FIG. 9. The vertical axis of FIG. 9 indicates temperature T at the contact surface area 114. The horizontal axis of FIG. 9 indicates distance d measured radially outward from the axis 103. The specified surface temperature gradient 115 of FIG. 9 extends radially across the contact surface area 114, and declines continuously in radially opposite directions from a central radius r3 midway between the inner and outer radii r1 and r2. The specified gradient 115 also is uniform circumferentially around the entire contact surface area 114.

The infrared radiation sensor 70, the microprocessor 80, and the output device 82 (FIG. 4) are used to examine and evaluate the weld 108. The field of view 71 of the sensor 70 is not large enough to encompass the entire contact surface area 114. However, the field of view 71 is large enough to extend radially across the contact surface area 114 fully between the inner and outer radii r1 and r2, and thereby to overlie fully the entire width of the weld 108. The weld 108 is inspected for compliance with specified conditions of size and continuity by (i) sensing surface temperatures by sensing infrared radiation across the scanned field 71 at a plurality of locations that are spaced apart circumferentially about the surface area 114, and (ii) comparing the sensed surface temperatures at each of those locations with the specified surface temperature gradient 115.

From the above description of the invention, those skilled in the art will perceive improvements, changes and modifications. Such improvements, changes and modifications within the skill of the art are intended to be covered by the appended claims.

Having described the invention, the following is claimed:

1. A method for welding and weld inspection comprising the steps of:

placing first and second welding electrodes against corresponding first and second contact surface areas on a pair of adjoining metal parts;

directing a welding level of electric current between said electrodes to form an electrical resistance weld between said parts;

removing said first electrode from said first contact surface area;

subsequently sensing surface temperatures at said first contact surface area by sensing infrared radiation emitted from said first contact surface area under the influence of heat previously generated resistively by said welding level of electric current; and evaluating said resistance weld by comparing said sensed surface temperatures with specified surface temperatures corresponding to specified weld conditions;

said evaluating step comprising comparing said sensed surface temperatures with a specified gradient of surface temperatures extending fully across said first contact surface area;

said first contact surface area being annular and said specified gradient extending radially across said first contact surface area;

said sensing step comprising sensing said surface temperatures at a plurality of locations that are spaced apart circumferentially around said first contact surface area;

said evaluating step comprising comparing said sensed surface temperatures at each of said locations with said specified gradient.

2. The method as defined in claim 1 wherein said sensing step comprises sensing surface temperatures throughout a field of view fully encompassing said first contact surface area.

3. A method for weld inspection of an inflator assembly comprising the steps of:

providing an inflator assembly having a storage chamber, an ignitor with an electrode pin and a bridgewire, and a burst disk;

placing first and second welding electrodes against corresponding first and second contact surface areas on said electrode pin and said bridgewire, respectively;

directing a welding level of electric current between said electrode pin and said bridgewire to form an electrical resistance weld between said electrode pin and said bridgewire;

removing said first electrode from said first contact surface area;

subsequently sensing surface temperatures at said first contact surface area by sensing infrared radiation emitted from said first contact surface area under the influence of heat previously generated resistively by said welding level of electric current;

evaluating said resistance weld by comparing said sensed surface temperatures with specified surface temperatures corresponding to specified weld conditions;

performing the same steps on said storage chamber and said burst disk.

4. The method as defined in claim 3 wherein said evaluating step comprises comparing said sensed surface temperatures with a specified gradient of surface temperatures extending fully across said first contact surface area.

5. The method as defined in claim 4 wherein said sensing step comprises sensing surface temperatures throughout a field of view fully encompassing said first contact surface area.

* * * * *